April 30, 1968     C. H. LEIPER ET AL     3,381,068

THERMOFORMING AND SCORING METHOD AND APPARATUS

Filed July 1, 1965     7 Sheets-Sheet 1

INVENTORS
CHARLES H. LEIPER
MORTON A. LOWENTHAL
BY WENDELL B. SHEARER

James F. Snowden
ATTORNEY

April 30, 1968 C. H. LEIPER ET AL 3,381,068
THERMOFORMING AND SCORING METHOD AND APPARATUS
Filed July 1, 1965 7 Sheets-Sheet 2

INVENTORS
CHARLES H. LEIPER
BY MORTON A. LOWENTHAL
WENDELL B. SHEARER
James F. Snowden
ATTORNEY

INVENTORS
CHARLES H. LEIPER
MORTON A. LOWENTHAL
BY WENDELL B. SHEARER

James P. Snowden
ATTORNEY

INVENTORS
CHARLES H. LEIPER
MORTON A. LOWENTHAL
BY WENDELL B. SHEARER

ATTORNEY

INVENTORS
CHARLES H. LEIPER
MORTON A. LOWENTHAL
BY WENDELL B. SHEARER

James F. Snowden
ATTORNEY 3,381,068
THERMOFORMING AND SCORING METHOD
AND APPARATUS
Charles H. Leiper, Bloomfield, and Morton A. Lowenthal,
Stamford, Conn., and Wendell B. Shearer, Longmeadow, Mass., assignors to Mobil Oil Corporation, a
corporation of New York
Filed July 1, 1965, Ser. No. 468,726
10 Claims. (Cl. 264—89)

ABSTRACT OF THE DISCLOSURE

A process and apparatus for vacuum forming plastic sheet material into a container body having an integral closure lid connected therewith by a folded and scored tear strip in which the heat-softened sheet is initially shaped in a deep mold cavity containing an extended plunger for shaping an undercut section of the article and a retracted reshaping plunger using a plug assist in combination with vacuum and compressed air while the sheet is clamped outside the periphery of the cavity at distances spaced to regulate the amount of sheet material drawn into the mold cavity for stretching into an article of uniform wall thickness; then the reshaping plunger is advanced to peel material away from part of the mold surface while still in a plastic condition in forming a folded strip around part of the closure of the article and to score a groove in the folded strip.

---

This invention relates to an improved method and apparatus for forming hollow articles from sheets or strips of thermoplastic materials. More particularly, it is concerned with the thermoforming of a hollow container having an integral closure, especially a closure having a tear strip formed during the forming operation and used at a later time for opening the container.

Various methods of molding containers and other hollow articles from thermoplastic materials are well known in the prior art. Plastic containers have found increasing applications in recent years; however, despite their light weight and toughness, their use has been restricted by the cost and characteristics of the plastic composition. Disposable containers of substantial size intended for modestly priced food products, such as milk, other beverages or the like, should be manufactured with a minimum amount of the plastic material to minimize cost consideration. For instance, milk containers formed from high-impact modified polystyrene should not have an average wall thickness greater than about 30 mils (0.030 inch) currently if such containers are to successfully compete with containers made of paper and glass. While containers prepared from high impact modified polystyrene and other thermoplastic compounds have adequate physical strength in thin sections of the material, many problems are presented in producing such containers. For example, the release of articles having undercut surfaces from a mold normally involves the separation or opening of the mold into two or more sections, and this increases the cost of the molds and also requires the concomitant use of more expensive molding equipment.

Hollow containers having hermetically sealed closures are necessary or desirable for many purposes. In a container intended to maintain this sealed condition until the user receives the product, an integral closure is highly desirable. It is also advantageous to have such a closure provided with an opening device, such as a tear strip. There is a further advantage in forming a tear strip during the shaping of the container rather than later. As an adjunct to an improved product, the closure should desirably be resealable or recloseable; not necessarily in leak-proof condition but at least splash proof.

This invention is particularly concerned with thermoforming operations in which a web or sheet of thermoplastic material is first softened by heat and then formed or shaped while in this stretchable plastic state by being drawn or pressed against the contours of a mold or die under the influence of a fluid pressure differential. The latter may be exemplified by the application of a vacuum at the mold surface while allowing atmospheric pressure to shape the heat softened thermoplastic material against the mold. Alternatively, an elevated pressure produced by compressed air or another gas may be utilized to press the softened material against the mold contours. For many purposes, a combination of these two techniques is preferred with the softened sheet material being subjected to vacuum on the face contacting the mold surfaces and to a substantial positive pressure on its other face as this combination provides greater versatility and better control in the forming operation.

It is a primary object of this invention to provide an improved method and apparatus for manufacturing a container having an integral closure.

Another object of our invention is to provide a novel method for manufacturing from thermoplastic material by thermoforming techniques containers capable of holding liquid or dry contents and having an integral closure hermetically sealed and provided with a tear strip or stress-formed pull tab.

A further object of our invention is to provide a novel method and apparatus for forming containers from thermoplastic materials using thermoforming techniques wherein such containers have a hermetic and integral closure equipped with a tear strip and also with latching means for repeatedly resealing the closure (e.g. by fastening a closure lid in the closed position) after removal of the tear strip.

Still further objects of our invention will be apparent from the following description taken in conjunction with the accompanying drawings where the features of novelty which characterize our invention will be pointed out with greater particularity and set forth in the appended claims.

In general, the present invention is concerned with a process for thermoforming a shaped article from a thermoplastic material, and particularly the step which comprises reforming said material subsequent to the initial formation of the shaped article by intimate contact with the surface of a mold and, while still maintained in a heat softened, stretch-resistant, flexible, plastic condition, by peeling a predetermined area of the initially shaped material off of said mold surface and back on itself to produce a single fold of the material of said area as well as apparatus for carrying out said step.

Narrower aspects of the invention relate to scoring the thermoplastic material within the mold, reforming it into a double-walled section within a closure cavity in a female mold, reshaping the article with a single stroke of a reforming plunger which may also score the folded section, utilizing retractable undercut plungers for intricate shapes and controlling the amount of material drawn into the mold.

In the drawings wherein certain preferred embodiments of the invention are shown in the production of container bodies by thermoforming, with like reference numerals designating like parts in all figures.

It will be appreciated that the type of thermoplastic or thermoelastically deformable material employed in the present process is generally determined by the economics and duty in which the container will eventually be placed. Among the many thermoplastic resins suitable for various purposes and adaptable to thermoforming are high-impact polystyrene, polybutadiene, styrene-butadiene blends or copolymers, polyvinylchloride and related vinyl polymers, polyallomers, nylon, formaldehyde polymers, polyethylene, polypropylene, nitrocellulose, cellulose acetate, cellulose propionate, cellulose acetatebutyrate, polymethylmethacrylate, ethyl cellulose, benzyl cellulose and ether-esters of cellulose.

In accordance with one embodiment of our invention there is provided in a conventional type of molding machine, an upper and a lower platen. On the upper platen is mounted a single female mold having a closure cavity. The female mold may be provided with passages to permit the circulation of a heat transfer medium to cool, heat or maintain a constant temperature in the female mold. The female mold is also provided with suitable passages for drawing a vacuum at various locations within the cavity of the female mold during the molding operation. A fluid-tight integral closure including a tear strip is formed during the molding operation by a reforming or reshaping plunger movably attached to the female mold as described more fully hereinafter. On the lower platen there is mounted an assist plug provided with a blowing air tube to introduce compressed air into the container to transfer the plastic material from the surface of the plug into intimate contact with the female mold.

To outline the sequence of operations, the thermoplastic material in sheet or web form, after being heated to a softened state by suitable means, such as radiant heaters, infrared lamps, etc. is moved into position between the upper and lower platens. The female mold including clamping grid is lowered to a position near and above the material. Thereafter, the clamp member mounted on the lower platen is raised into contact with the thermoplastic material. Pressure is exerted on these clamping devices to rigidly hold the border of the thermoplastic material therebetween during the subsequent forming steps.

The assist plug is then pushed through the original plane of the sheet of thermoplastic material thereby stretching and drawing the material into the female mold. During this movement of the assist plug, a slight vacuum may be drawn within the cavity of the female mold as more fully described hereinafter. When the assist plug reaches its fully extended position, full vacuum is applied to exhaust air trapped within the female mold cavity and full air pressure is applied through the blowing channel within the assist plug. By this procedure, the material is expanded into contact with the surfaces within the female mold and also into the closure cavity which is a part of the female mold, and the thickness of the original sheet material is reduced to the predetermined desired wall thickness of the final article.

Upon completion of this initial formation of the container body and closure, a reforming or reshaping plunger associated with the closure cavity of the female mold is moved into the closure cavity. As a result of this movement and the configuration of the reforming plunger and the closure cavity, a closure having a tear strip is integrally formed on the container as more fully described hereinafter. During the plunger movement in this step, the thermoplastic material is reformed or reshaped in being peeled off of the closure cavity and folded back against itself to form the tear strip and thus complete the shaping of the container body. In an optional but preferred embodiment of the invention, this reforming plunger is so disposed within the closure cavity that it also scores or pinches a line on the folded portion or tear strip in the same stroke of the plunger. In certain of the attached drawings, an optional second movable plunger with undercut surfaces is provided in the female mold, and this plunger is retracted to aid in the ejection of the molded article from the female mold where undercut shapes are involved. The thermoplastic material is cooled during the molding operation to a temperature at which the article can be removed from the mold without affecting the shape of the article.

After formation of the container body including closure and tear strip, the lower platen is returned to its initial position, and stripping air is introduced through the vacuum passages into the cavity of the female mold; but first both plungers are retracted from engagement with the article in the female mold. The upper platen carrying the female mold is then raised, whereupon after clearing the mold, the thermoplastic sheet with the article projecting thereabove is advanced by appropriate mechanism to the next station or position in continuous operations and another heat-softened strip or section of the plastic material moves into position between the platens for the next forming cycle. The shaped article is then trimmed and the excess material is usually returned to the extruder or other auxiliary equipment for use again in the preparation of the thermoplastic sheet from which the article is formed.

Figures 1, 2:
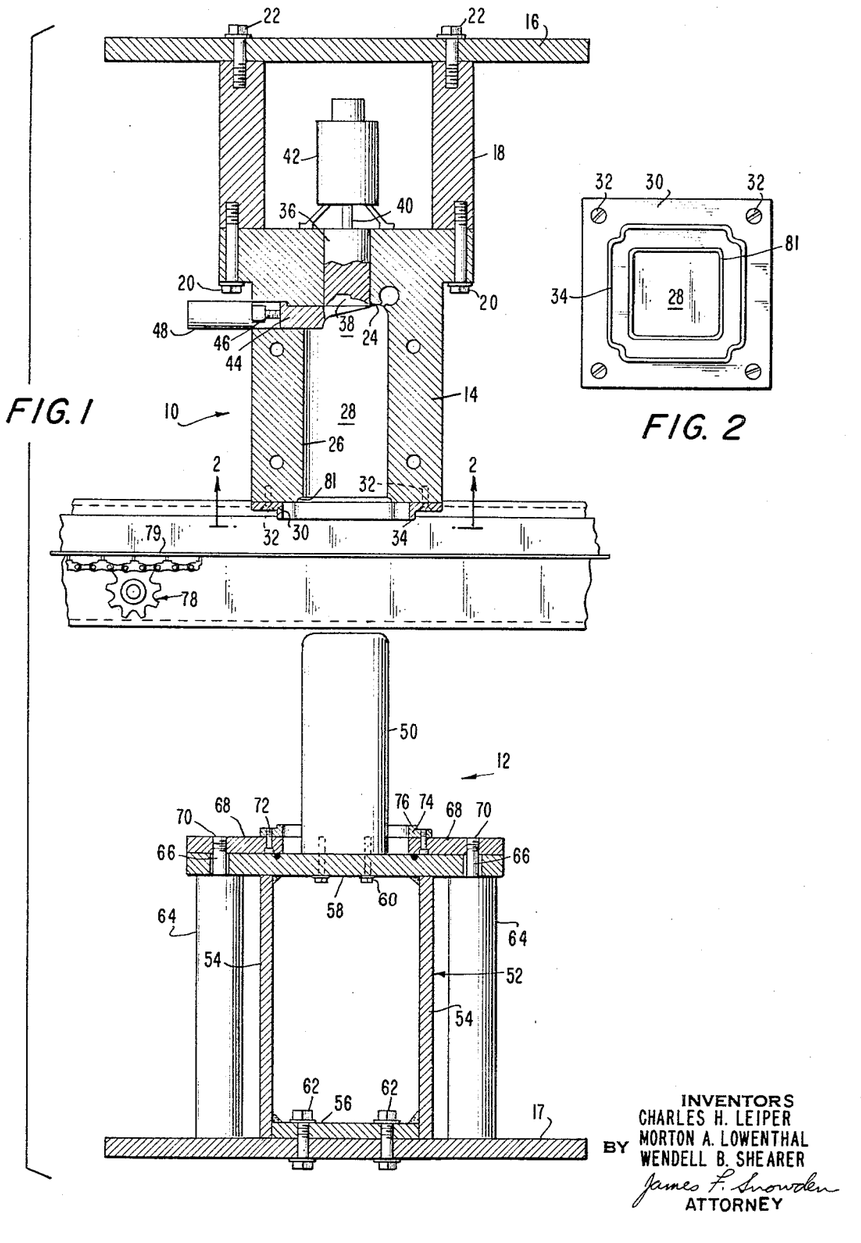
FIG. 1 is a vertical sectional side view taken on a central plane of the die assembly in a partially open position prior to molding operations with some accessories omitted for greater clarity.
FIG. 2 is a partial bottom view of the female mold illustrating the clamping member provided on the base of the female mold in which certain details in the top of the mold are omitted.

Referring now to FIG. 1, a portion of a molding machine, such as that manufactured by the Brown Machine Co. of Beavertown, Mich., is shown with a unique female mold assembly and a plug assist assembly mounted thereon. While the particular disposition of apparatus elements depicted in FIG. 1 does not correspond with any stage of the actual forming cycle, this view illustrates the construction and arrangement of various parts of the equipment. The female mold assembly 10 includes a female mold 14, rigidly attached to an upper platen 16 by spacer bars 18 and bolts 20 and 22. The upper platen 16 and the female mold assembly 10 are constructed and arranged for vertical movement in the molding machine by suitable mechanism (not shown).

The female mold has a top wall 24 and side walls 26 which form the main cavity 28 in the female mold 14 for shaping the container body therein. To the mouth of the female mold 14, there is affixed a clamping plate 30 by screws 32. The configuration of the raised clamping grid 34 of the plate 30 is more particularly shown and described in connection with FIG. 2.

In the upper portion of the female mold 14, there is provided a reforming and scoring plunger 36 which moves within a closure cavity 38 to form the closure and tear strip of the container as more fully described later. The plunger 36 is attached to a rod 40 of a piston reciprocable in the pneumatic cylinder 42 which is rigidly mounted on top of mold 14. Extending horizontally into the female mold 14 and partially surrounding the closure cavity 38, there is a fork-shaped second plunger 44 affixed by threads to rod 46 of a piston 47 (see FIG. 3) in the cylinder 48 fixed to the outside of mold 14. Plunger 44 has undercut surfaces and is retractable to assist in the removal of the shaped article from the female mold.

The plug assist assembly 12 is comprised of a plug assist 50 and an assist mounting box or support generally indicated as 52. The box 52 has side walls 54 attached to base and top walls 56 and 58, respectively, e.g. by welding. The plug assist 50 is mounted on top wall 56 by bolts 60 and the assist mounting box 52 is affixed to lower platen 17 by bolts 62. Positioned outside of the box 52 are two cylinders 64 having pistons 65 (see FIG. 3) actuating piston rods 66 which are attached to a vertically reciprocable clamp support 68 by threads 70. Mounted on the clamping support 68 by screws 72 is a clamping plate 74. The configuration of the raised clamp grid 76 of the lower clamping plate 74 is substantially identical to the configuration of the upper clamping grid 34 around the mouth of the female mold 14.

In FIG. 1, there is also illustrated a feed mechanism, generally indicated as 78, for introducing the thermoplastic web or sheet 79, after heating, to a position between the upper and lower platens 16 and 17.

Referring to FIG. 2, wherein the clamping plate 30 near the mouth of the female mold is more particularly illustrated in a bottom plan view, the clamping grid 34 is spaced away from the bevelled edge 81 of the mouth of the mold and its cutaway or indented corners do not conform with the configuration of the corners of the square mold cavity. The vertical distance of the grid 34 below the mold entrance is significant as it provides for markedly better distribution of material in the article as represented by uniformity in thickness of the article walls by minimizing contact of the hot plastic sheet with the cold bottom of the mold, for such contact tends to freeze the material in situ rather than allow it to be drawn uniformly into the mold. This raised rib lessens the undesirable drag or friction at the edge 81 of the mold cavity, and that edge is preferably bevelled or rounded to minimize the drag. Moreover, the grid 34 facilitates the formation of a better "bubble" at the mold entrance during the forming operation. On the other hand, the entire upper surface of the lower clamp plate 74 may be flat instead of having the raised grid 76 shown, for the configuration of the lower plate has little influence on the drag and cooling of the plastic material being pushed into the upper mold.

The horizontal distance between grid 34 and the mouth of the mold determines the area of sheet 79 available for drawing into the mold and this area is a substantial factor in determining the wall thickness of the article. The cut out corners of the grid control or restrict the area of thermoplastic sheet material which can be drawn into the corners of the mold and thus avoid the tendency toward producing articles having thicker walls at the corners by drawing excess material into the corners of the mold. The more angular the cross section of the mold, the greater the tendency toward increased wall thickness in the corners of articles and the deeper the cut outs at the corners of the clamp grid 34 required to minimize variations in wall thickness.

In restraining excess material from entering the mold corners, it is not necessary to utilize a grid of the exact configuration of FIG. 2 as a square grid could be employed with a ball or stud having the same height as the grid and placed within the square at the same location as each indented corner of the grid shown in FIG. 2.

Figure 3:
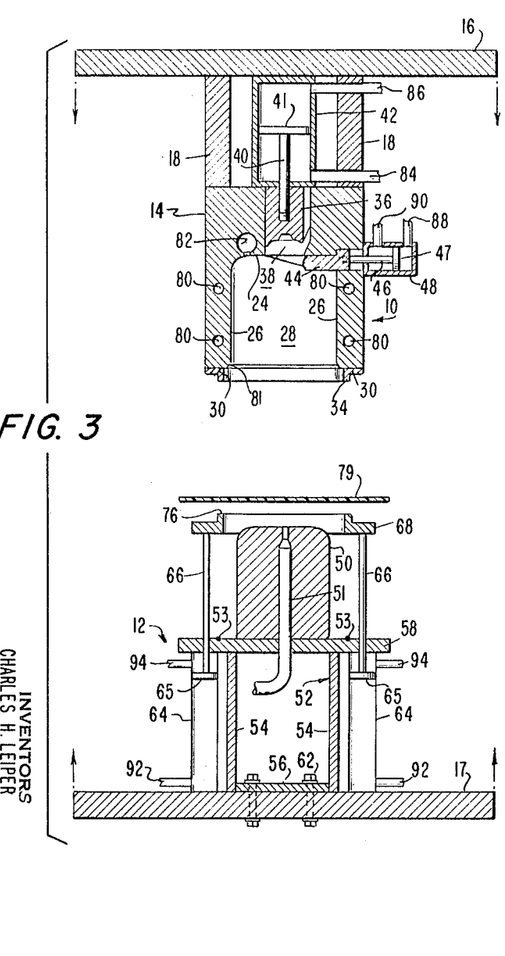
FIGS. 3, 4, 5, and 6 are schematic vertical central sections of the mold assembly viewed from the side opposite to FIG. 1 and sequentially illustrating the initial formation of the container body.

Referring now to FIGURE 3, the female mold 14 is provided with passages 80 for the circulation of a heat transfer medium therethrough to either cool or to heat the female mold as operating and design factors dictate. In the upper section of the mold there are also one or more passages 82 communicating with a plurality of small diameter ports 83 (see FIG. 7) in the mold surface for drawing a vacuum within the cavity of the female mold during the forming operation as well as introducing air into such cavity during withdrawal of the molded piece. The closure cavity 38 is bounded in part by the reforming plunger 36 and the undercut plunger 44, as more particularly illustrated and described with reference to FIGS. 8 to 11. For certain applications, either or both of the plungers, and likewise the mold wall surrounding the closure cavity, can be provided with heating means, such as heat transfer passages, heating cartridges, or alternatively thermal insulation barriers or the like. For example, such devices may be employed to adjust the temperature of the initially formed closure section of the article to the optimum for reforming or for the pinching or scoring of the tear strip. The reforming plunger 36 is mounted on a rod 40 of a piston 41 positioned within the cylinder 42 which is provided with ports 84 and 86. The undercut plunger 44 is affixed to rod 46 of a piston 47 positioned within the cylinder 48 having the cylinder ports 88 and 90.

The plug assist assembly 12 is shown with the assist plug 50 equipped with a blowing air tube 51, and the plate 58 having a gasket 53 on the upper surface thereof. Additionally, the cylinders 64 which actuate clamp support plate 68 are provided with cylinder ports 92 and 94. As mentioned earlier with respect to the plungers, in certain applications it may be desirable to provide heating means, such as heating cartridges or the like, within the plug assist.

The following description in conjunction with FIGS. 3, 4, 5 and 6 illustrates the initial formation of a container body including closure. The condition or position of the various parts of the apparatus in FIG. 3 prior to bringing a heated section of the plastic sheet 79 between the platens is as follows:

(1) The upper and lower platens 16 and 17 are essentially stationary in their fully retracted positions with a coolant flowing through passages 80 of the female mold.

(2) The reforming plunger 36 is in its upper or retracted position with cylinder port 84 pressurized and port 86 open to the atmosphere.

(3) The undercut plunger 44 is in its inner or advanced position as side cylinder port 88 is pressurized and port 90 is open to the atmosphere.

(4) The pressure within the cavity of the female mold is atmospheric.

(5) While the lower clamping grid 76 is somewhat below the plastic sheet 79, this member and its supports are in their fully extended positions relative to lower platen 17 inasmuch as cylinder ports 92 are connected to a source of compressed air and ports 94 are open to the atmosphere. The actuating cylinders 64 are maintained in this condition throughout the entire molding cycle; nevertheless, the grid 76 is moved relative to both sheet 79 and platen 17 as described hereinafter.

The strip of the thermoplastic sheet 79, which has been heat softened to an optimum forming temperature (i.e., to a stretchable plastic condition) by heating means (not shown), is then advanced into position between the upper and lower mold assemblies and halted by the feed means. Next the upper platen 16 is moved downwardly to the point where the clamping grid 34 contacts sheet 79. As soon aas the upper assembly 10 reaches this fully extended position, the lower platen 17 is raised to the position shown in FIG. 4. The lower clamp grid 76 is thereby pressed against the lower surface of the sheet 79 thus trapping the sheet around the entrance of the female mold between the raised surfaces of grids 34 and 76. Positive pressure is maintained on the cylinder ports 92 thus retaining this grip of the grids 34 and 76 on the plastic sheet 79 during the remainder of the forming operation.

Figure 5:
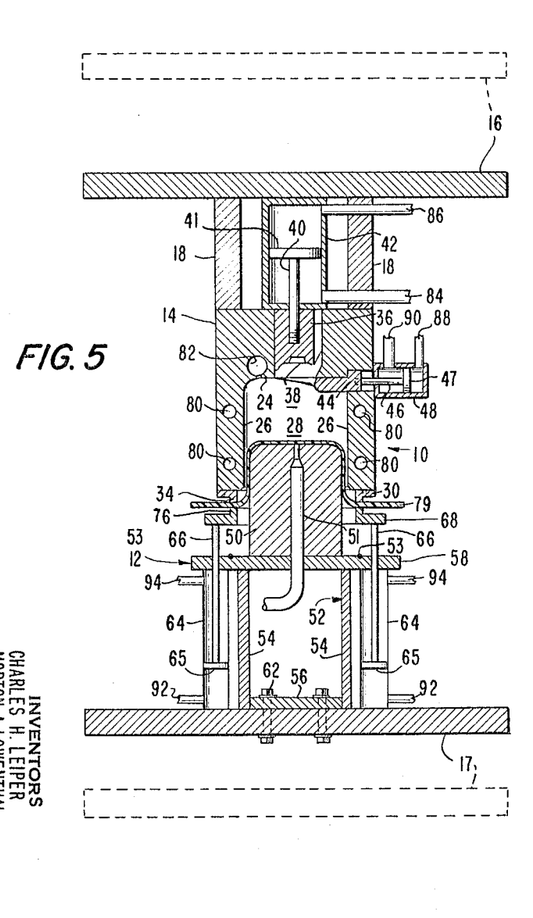

In FIG. 5, the lower platen is shown in a more advanced position in its upward movement, and it has reached the point where the plug assist 50 has stretched the plastic sheet 79 and pushed it half-way into the mold cavity 28. At a rate consistent with the reduction in volume of the cavity 28 caused by the insertion of the plug 50, a vacuum is applied to the vacuum passage 82 in a controlled manner such that the pressure is slightly above atmospheric in the unfilled portion of the cavity. In view of the limited number of the very small ports 83 (FIG. 7) and considerable volume of air being exhausted therethrough from the mold cavity, it will be appreciated that the pressure in cavity 28 can be positive at the same time that a subatmospheric pressure exists in passage 82. By maintaining this slight positive pressure, the warm plastic sheet 79 is prevented from contacting the cooler surfaces of the female mold 14 until the plug 50 has almost reached its fully extended position. With careful regulation of the rate of vacuum application by means of a valve (not shown) in the vacuum supply line and by proper choice of the size and configuration of the clamp grids 34 and 76 close control of the weight, wall thickness and uniformity of wall thickness of the shaped article can be achieved.

Figure 4:
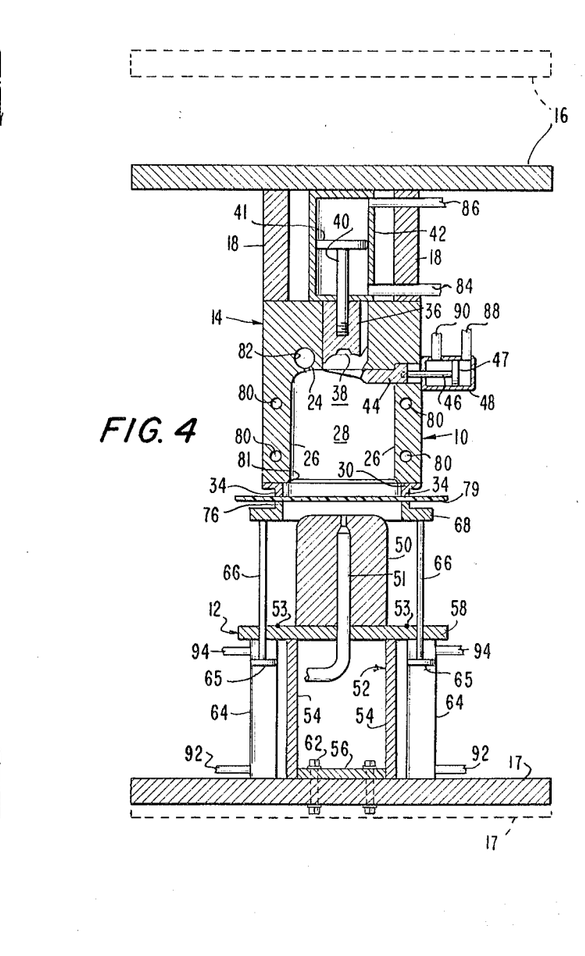
Figure 6:
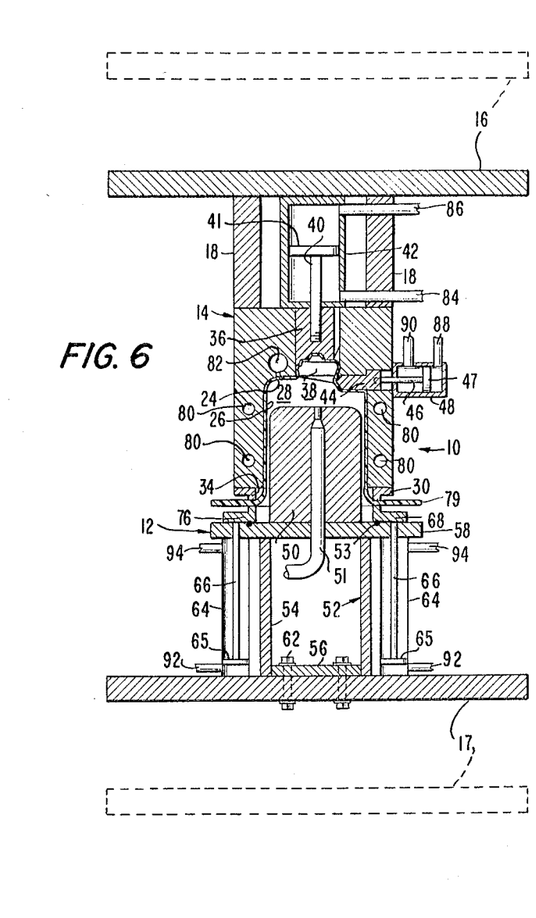

As illustrated in FIGS. 5 and 6, the lower clamp grid 76 is prevented from moving upward beyond its position indicated in FIG. 4 despite the continuing upward motion of lower platen 17 due to the resistance of the female mold assembly 10 in its lowermost position. As the lower platen moves further upward, pressurized air in cylinders 64 is displaced through ports 92 back to an accumulator or storage tank (not shown) without lowering the cylinder pressure and the plate 58 comes to rest against the lower surface of clamp support plate 68 thereby compressing gasket 53 between plates 58 and 68 as shown in FIG. 6. With the gasket 53 then serving as a seal, compressed air is introduced through blowing air tube 51. This expands the stretched and partially formed thermoplastic material off of assist plug 50 and against the wall surfaces of female mold 14 under full air pressure which is substantially above atmospheric pressure, and preferably between 75 and 125 pounds per square inch gauge pressure (p.s.i.g.).

At about the same time, full vacuum (e.g. about 0.75 p.s.i. absolute) is applied to passage 82 to prevent air from being entrapped between the cool walls of the female mold 14 and the plastic sheet 79. Sufficient closing pressure is maintained between the upper and lower assemblies 10 and 12 to prevent leakage of compressed air either around the clamp grid 76 or gasket 53. The upper and lower mold assemblies are maintained in the positions shown in FIG. 6 for a brief interval as the initial formation of the article is completed with the plastic material in intimate contact with the entire surface of the female mold 14 including closure cavity 38. The walls of the mold are generally cooled to partially harden the shaped layer of thermoplastic material but still leave it in a sufficiently plastic state so that it can be severely flexed and folded without exceeding its elastic limit as by cracking.

The molding cycle is continued in the enlarged FIGS. 7 to 10, inclusive, which depict in sequence the reforming or reshaping of the closure and the scoring thereof in producing a tear strip in an integral closure generally similar to those shown in FIGS. 12 to 16, inclusive.

Figure 7:
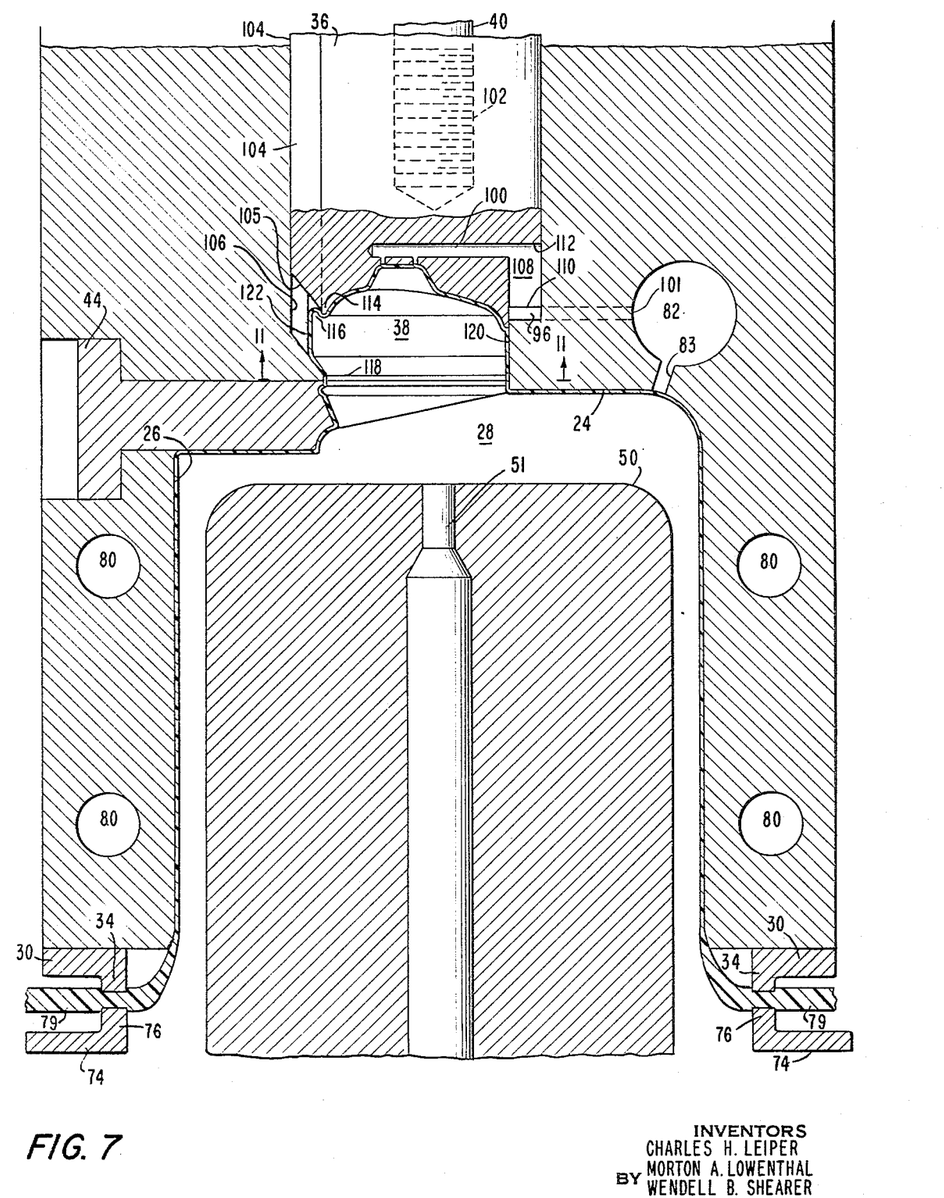
FIG. 7 is an enlarged and more detailed section of part of the mold assembly viewed from the same direction and on the same plane as FIG. 1. It shows the container body at the same operation stage as in FIG. 6, immediately prior to the reforming of the closure component of the container.

Turning now to FIG. 7, the reforming plunger 36 is attached by means of threads 102 in its cylindrical upper end to the rod 40 of actuating piston 41 for vertical movement in closure cavity 38. The lower end of this plunger is provided with vacuum ports similar to wall ports 83, and these plunger ports communicate with the vacuum passage 82 by means of the channels 100 and 101, respectively. In addition, this reforming plunger is provided with a narrow spline or key which terminates in a scoring knife edge 105 as its slanted lower end. A vertical guide groove 106 is cut part way through the top wall 24 of the female mold for engagement with the spline 104 and the configuration of this narrow groove is better understood by reference to FIGS. 8–11 wherein the spline 104 has been removed for greater clarity of illustration. Spline 104 engages the guide slot 106 in a close sliding fit which permits plunger 36 to move only vertically in the closure cavity 38 and this engagement prevents any wobble or rotation of the plunger as it moves up or down. An empty space 108 is provided at the lower rear end of the plunger 36 to restrict the length of stroke of the plunger by halting it when the plunger shoulder 112 reaches the ledge or stop 110 within the wall of mold 14 as in FIG. 9. Groove or slot 96 across the ledge 110 maintains communication between the vacuum channels 100 and 101 at all times, even when the plunger is in motion.

Figure 11:
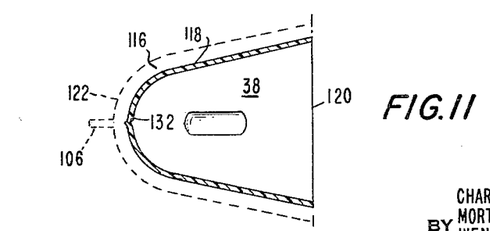
FIG. 11 is a fragmentary bottom plan view, partly in section, of the closure cavity taken along the line 11—11 of FIG. 7.
Figure 12:
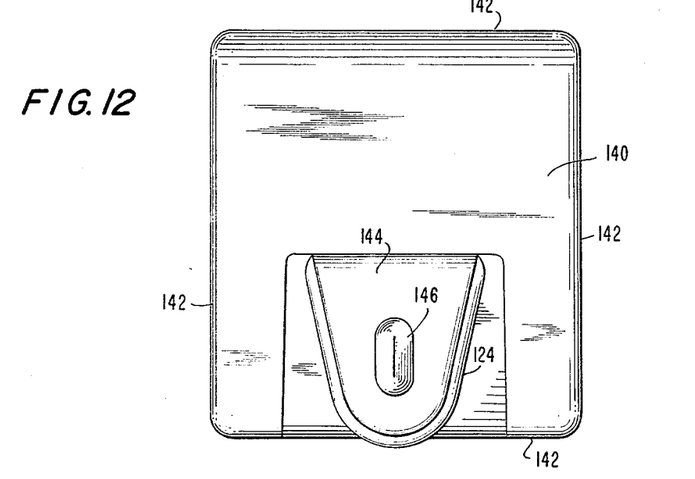
FIG. 12 is a plan view of another embodiment of a container formed in accordance with the invention and having the closure located forward of that shown in previous views.
Figure 13:
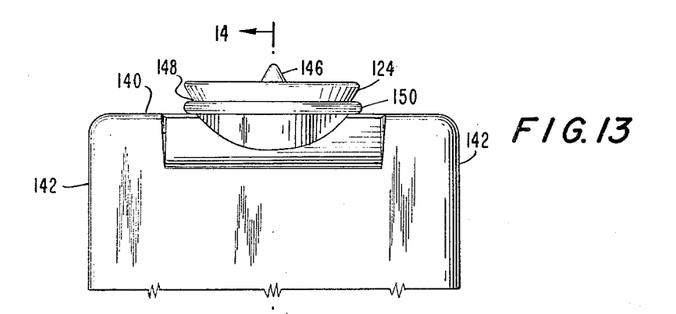
FIG. 13 is a front elevation of the upper part of the container of FIG. 12.
Figure 14:
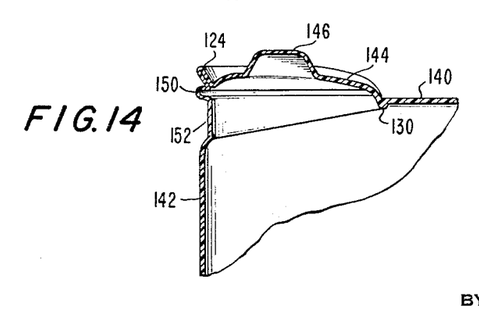
FIG. 14 is a partial section of the container taken along the line 14—14 of FIG. 13.

FIG. 11 is a bottom view of the closure cavity 38 taken along the line 11—11 of FIG. 7 which illustrates the extent of the tear strip space 116 surrounding the U-shaped edge 114 of the periphery of the lower end of plunger 36. Similarly, the space 116 provided for the accumulation and folding of the thermoplastic material during the reforming action is a U-shaped zone in horizontal cross section which extends from the outer wall 122 of the closure cavity 38 inward to the ledge or shoulder 118 in this cavity. This ledge corresponds in shape to the scoring edge of the reforming plunger 36 but is slightly larger to provide a clearance of preferably 3 or 4 mils (0.003 or 0.004 inch) when plunger 36 is in its lowermost position. The ledge 118 thereby serves as an anvil or scoring edge which coacts with the moving edge 114 to score a groove in each layer of the fold as described hereinafter. In the particular embodiment disclosed herein, the scoring ledge 118 and the tear strip space 116 do not extend completely around the periphery of the closure cavity inasmuch as it is desired to form a hinge rather than a tear strip across the rear of the closure on the article; hence, the back wall 120 of closure cavity 38 is a flat wall without an indentation or tear strip space. However, the tear strip space may be extended around the full periphery of the closure cavity in instances where a fully removable closure is sought.

It will be noted that in the initial shaping or formation of the article, the thermoplastic material is blown or transferred into intimate contact with all contours of surface within the mold 14, including the outer wall 122 of the tear strip space and the configurations of undercut plunger 44 as well as the large wall surface of the principal mold cavity 28, and it is shaped by these surfaces. After a controlled period of time has elapsed, which interval depends largely upon the particular plastic material employed, for cooling and slightly hardening the article in its initial shape, it is subjected to the peel back reforming technique demonstrated in FIGS. 7 to 9. During this operation, the layer of thermoplastic material is maintained in a heat softened and plastic condition which may be described as semirigid in that the material is soft enough to be flexed and reshaped by the application of suitable force or pressure while otherwise retaining the characteristics of its initial molded shape including its initial molded thickness. Expressed otherwise, the thermoplastic material is kept soft and plastic enough to be peeled away from the upper part of outer wall 122 of closure cavity 38 without tearing, splitting or cracking (i.e., remaining within its elastic limit) when folded in a reverse bend or even creased but it has cooled sufficiently to harden and toughen it to the extent that no substantial stretching and reduction in thickness occurs during reforming; moreover, it is also maintained sufficiently soft to be scored or grooved without cleavage when a suitable clearance is maintained between the scoring or pinching members. For example, a clearance of between about 3 to 7 mils is generally desirable for high-impact polystyrene containing a rubbery copolymer or an elastomer such as polybutadiene, the optimum clearance varying with the composition of the polymeric material. In the particular embodiment described herein, it is important that the material in and around the tear strip space 116 be maintained in the aforesaid plastic, reworkable condition since it is this area of material that is subjected to reshaping.

Figure 8:
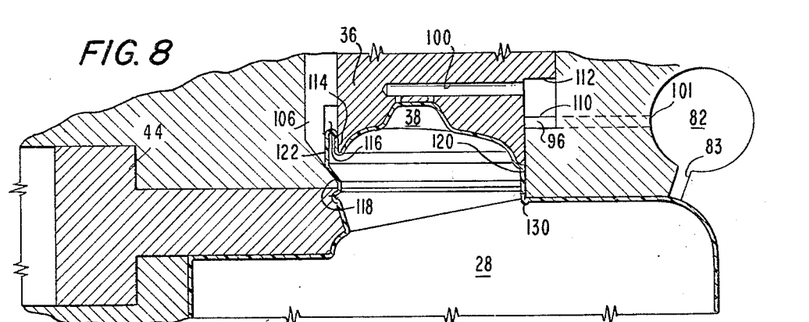
FIGS. 8, 9, and 10 are enlarged fragmentary sectional views, generally similar to FIG. 7 with the notching spline 104 and plug assist 50 removed for better illustration. These three figures illustrate sequential stages in the closure reshaping operation.
Figure 9:
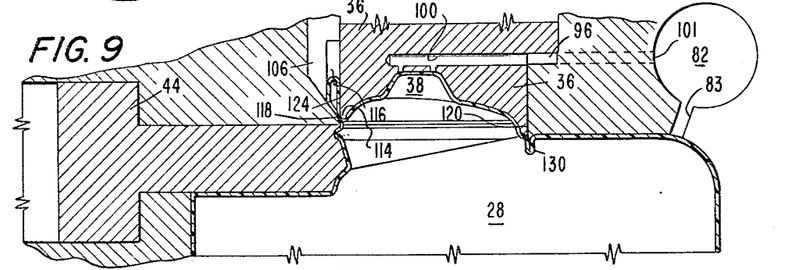

Stages of the reforming operation are shown in FIGS. 8 and 9. After compressed air is admitted to the port 86 (see FIG. 3) of cylinder 41 and the opposite port 84 is opened to the atmosphere, reforming and scoring plunger 36 moves downward as illustrated in FIG. 8 wherein the plunger is peeling the thermoplastic layer from the outer cavity walls 122 and form a single fold (or doubled layer) of thermoplastic material starting near the top of tear space 116. As the stroke continues in FIG. 8, the peeled material accumulates in tear strip space 116 as the length of the fold increases, and another fold is beginning to form at the point 130 in the principal mold cavity 28 and within the body of the hollow article. It is apparent that the tear strip space 116 must be somewhat greater in width than twice the thickness of the thermoplastic material in this location to permit peeling without compression or tearing of the material. The reforming plunger continues downwardly until it is halted when its shoulder 112 meets the stop ledge 110 in FIG. 9. By then, the single fold has been completed by the peeling of the initially formed layer of thermoplastic material from the upper half of the tear strip space 116, and the edge 114 of the plunger has advanced to a level slightly below (e.g. 1/64 inch) the edge of ledge 118. Inasmuch as the clearance between plunger edge 114 and ledge 118 is about 4 mils and each of the two layers of folded material which is still in a softened, plastic condition typically has a thickness of the order of 10 to 20 mils, the folded material is subjected to a scoring or pinching action between ledge 118 and edge 114 at the end of the stroke of plunger 36 which produces a permanent score line or groove in each exposed face of the material at the bottom of the fold. The thickness of material remaining in each such groove is approximately the same and the resulting folded and scored tear strip has two contiguous thinned sections of material along the score line having a total thickness of only a few mils. Accordingly, while the tear strip retains sufficient strength to preserve an intact hermetic seal during normal handling of the container, both layers of the tear strip may be readily and simultaneously parted along the score line by applying a moderate tearing force by hand in opening the finished container.

In addition, the knife edge 105 of spline 104 (shown only in FIG. 7) has approached to a distance of about 4 mils from the slanted wall of closure cavity 38 at the end of the stroke of plunger 36. This action scores both faces of the folded material leaving a substantially equal thickness of material remaining in the resulting groove of each layer in the score line which extends upward from the point 132 (FIG. 11) at the bottom of the tear strip to the top thereof. This secondary tear line also still maintains a hermetic seal during handling while facilitating the starting of a tear from the top of the tear strip. The internal straight fold 130 is also completed at the end of the plunger stroke but this fold is not scored inasmuch as it is designed to function as a hinge.

As indicated earlier, the thermoplastic material is partially hardened but in a plastic, workable state during the reforming operation so that the material retains the dimensions of its initial formation without being stretched into a larger and thinner layer or compressed into a smaller and thicker layer. Thus the material is merely peeled back on itself and scored under the pressure sufficient to cause plastic flow and thin out the material along the score line while maintaining enough clearance between the scoring members and enough plasticity in the thermoplastic material to avoid any cleavage which would ruin the hermetic seal of the single fold double-walled tear strip.

The necessary plasticity of the material for reforming the closure section of the article is readily controlled in practice by simple expedients, namely the temperature of the mold surfaces and the time interval during which the initially formed article layer is allowed to remain in contact therewith prior to the start of the reforming operation. Both of these factors affect the degree of hardening of the initially formed layer of the article and, of course, its workability or shaping characteristics. The mold temperature is readily regulated by adjusting the temperature and volume of the water or other coolant circulating through the channels 80, and the time of dwell of the initially shaped article in contact with the chilled mold surfaces can be easily altered as required by suitable adjustment of an automatic timing device as commonly used for controlling mold cycles. Suitable dwell times and mold temperatures may be determined for each specific thickness and composition of thermoplastic material by simple experimentation. When scoring in the mold is also involved, the scored line on the article should be carefully inspected to ascertain that no cracking or splitting occurs along that line, as such defects indicate that the material is being scored while it is too hard as a consequence of too much cooling.

Figure 10:
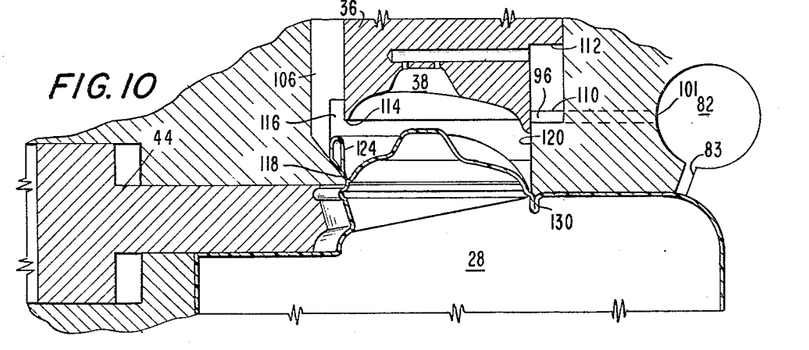

Upon completion of the downward stroke of the reforming plunger in FIG. 9, the molding apparatus is allowed to remain in this position for a brief interval while the entire shaped article hardens sufficiently to permit handling without damage thereto. Then, in preparing to remove the article, any compressed air inside the article is released by opening the air tube 51 in the assist plug to the atmosphere. The reforming plunger 36 and the undercut plunger 44 are withdrawn to their fully retracted positions as indicated in FIG. 10 by opening cylinder ports 86 and 88, respectively, to the atmosphere while applying compressed air through the ports 84 and 90, respectively. Retracting both plungers is a necessary prelude to releasing the article from the female mold as plunger 36 in its advanced position clamps the closure tear strip and the undercut surface of plunger 44 is interlocked with the contiguous portion of the article. Platen 17 is lowered to bring the lower mold assembly 12 down to the position shown in FIG. 3. Removal of the shaped article from the mold is accomplished by blowing air through the vacuum channels 82, which usually partially collapses the article, and at the same time returning the upper platen 16 to the position of FIG. 3.

Next, the feed mechanism 78 is actuated to carry the section of web 79 having the shaped article projecting thereabove out of the machine and to position a fresh section of heated plastic sheet between the mold assemblies 10 and 12 in preparation for the next molding cycle.

The shaped container body is thereafter cut out of the traveling web 79 by suitable shearing equipment. These hollow container bodies are later filled with their liquid or solid contents at a packaging plant while in an inverted position; then a bottom panel or section may be a welded in place by the heat sealing method to complete the container and thus provide a hermetically sealed package.

In reference to the similar container of FIGS. 12–16, inclusive, this article has side walls 142 and the top wall 140 with the closure section on the latter. The closure comprises a cover or lid 144, a lifting tab 146, an integral tear strip 124, a spout section 152 having a lock-sealing lip 150 and a flexible hinge-like member 130. The tear strip 124 is typically about ⅜ inch wide and is made up of a single fold of thermoplastic material which has been grooved or scored to a total thickness of about 4 or 5 mils along the score line 148 which extends around the U-shaped portion of the periphery of the closure. The sealing lip 150 is co-extensive with the tear strip and this lip is provided with an internal groove (see FIG. 14) into which the edge of the closure lid 144 may be inserted and retained in closing the container after removal of the tear strip.

Figure 15:
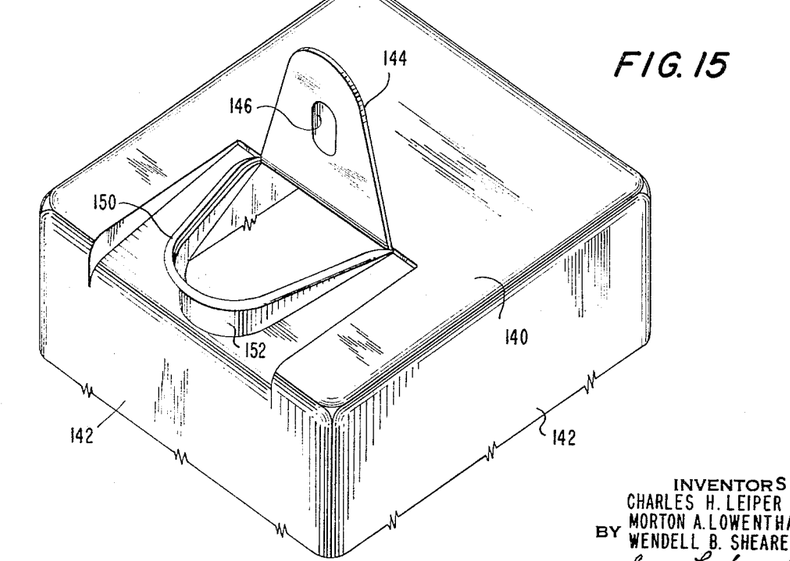
FIG. 15 is an isometric view of the top of the container of FIG. 12 illustrating the cover of the closure in the open position after removal of the tear strip.
Figure 16:
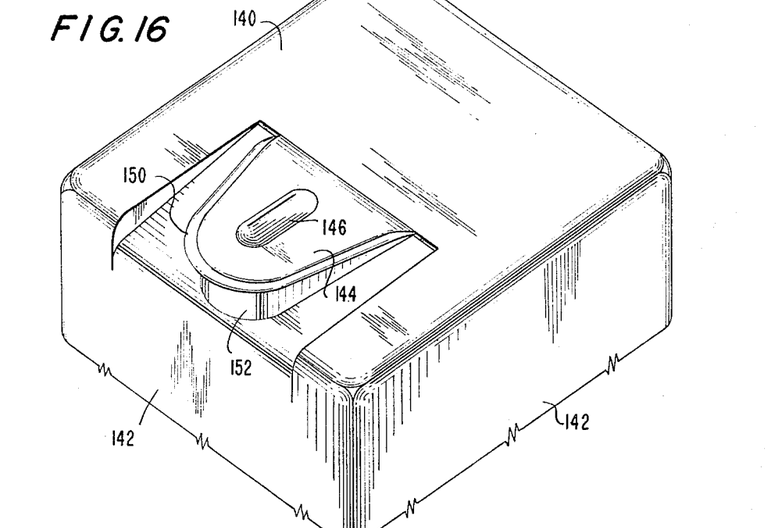
FIG. 16 is a similar isometric view of the same container showing the closure cover in its resealed position.

In FIG. 15, the container is shown with a tear strip 124 removed and the lid 144 pulled open for pouring. Tearing off the strip 124 leaves a thin sharp edge on the inner side of the beaded lip 150, which is advantageous in that this bead not only tends to produce a well defined stream during pouring but also minimizes the tendency of liquids to dribble over the pouring surface upon terminating pouring and returning a partially filled container to the upright position. After use of the container to pour a fractional amount of the contents therefrom, the balance of the contents may be resealed in a splash-proof condition by inserting the edge of the lid 144 within the inner groove of the sealing lip 15 as shown in FIG. 16. In addition, the slightly domed lid 144 may be fastened somewhat more securely in the resealed position by pushing downwardly on this flexible material with enough force to reverse its curvature so that it assumes an inwardly dished shape. Containers with such tear strip closures form no part of the present invention, and such containers are more particularly disclosed and claimed in the commonly assigned copending application Ser. No. 468,732 of Peter A. Latham et al., filed July 1, 1965.

From the disclosure hereinbefore, it is apparent that the present invention provides a simple, versatile, economical method and apparatus for reforming articles within the mold to produce one or more double-walled sections therein. Optionally, the double-walled or folded sections may be scored in producing tear strips as these are often desirable for integral closures on containers. While any such scoring action may be carried out after the removal of the article from the mold, it is far more advantageous to score the article while still warm and within the mold, particularly when this can be accomplished in combination with reforming in a single operation. Although reforming or reshaping, with a single stroke of a single reforming plunger is preferable in many instances, it is also contemplated that it may be desirable in other cases to utilize a plurality of such plungers either in separate locations or operating in conjunction with one another to perform several shaping operations on the same area of thermoplastic material in suitable sequence. For example, it is possible to have one reforming plunger operating through an opening in a larger reforming plunger. In addition, an unusually great range of shapes and configurations of plastic articles produced by thermoforming is possible when one or more retractable undercut mold plungers are utilized. Although a single mold has been shown and described herein, it will be appreciated that the present invention is equally applicable to the operation of multiple mold units as commonly employed in commercial plants. Also while the detailed discussion of devices for actuating certain mold elements has concerned pneumatic cylinders, equivalent mechanical means, such as hydraulic cylinders or toggle linkages, may be employed instead.

Although one embodiment of the present invention has been disclosed in considerable detail for purposes of illustration, it will be readily apparent to those skilled in the art that many other embodiments fall within the purview of this inveniton. Accordingly, this invention should not be construed as limited in any particulars except as may be recited in the appended claims or required by the prior art.

We claim:

1. A process for thermoforming a shaped hollow container body having an integral tear strip closure which comprises fastening a thermoplastic sheet material along a border thereof located outside of the mouth of a female mold of substantial depth and provided with a closure cavity therein; stretching and initially forming said sheet material into a hollow body having an integral closure component by means including exerting a fluid pressure differential on said material sufficient to provide intimate contact of said material with substantially all internal surfaces of said mold while said material is in a heat softened, stretchable, plastic condition; cooling said initially formed material to a softened, stretch-resistant, flexible, plastic condition while in contact with said mold surfaces; thereafter reforming and scoring said initially shaped closure component in said mold while said material is maintained in a softened, stretch-resistant, flexible, plastic condition by peeling a predetermined area of said material in the initially shaped closure component back on itself without substantial stretching in producing a single fold of said material on the exterior of said closure component and scoring said single fold to provide a tear strip having grooves of predetermined total thickness in the layers of said fold using a single stroke of a reforming and scoring plunger moving into said closure cavity in proximity to the surface thereof adjacent said area of material while maintaining a clearance between at least a part of the periphery of said plunger and the adjacent surface of said closure cavity greater than twice the thickness of the layer of said material in said area to provide sufficient space for folding the material of said area without other substantial distortion thereof until the end of said stroke whereupon said plunger approaches within scoring distance of a surface of said closure cavity, and withdrawing said plunger from contact with the reformed hollow container body to facilitate removal of said body from said mold.

2. A process according to claim 1 in which said thermoplastic material is high-impact polystyrene and the total thickness of material remaining in the layers of said single fold of material along said score line is between 3 and 7 mils.

3. A process according to claim 1 which comprises substantially fastening a heat softened thermoplastic sheet material along a continuous border thereof substantially completely surrounding an angular perimeter of the mouth of said female mold, said border being spaced at varying distances from said mouth with said distance decreased in areas of said sheet material adjacent to angles in said perimeter, and thermoforming said sheet material in contact with the interior surfaces of said mold with substantial stretching of said sheet material to form a hollow body of substantially uniform wall thickness which is substantially less than the thickness of said sheet material, whereby the amount of sheet material entering said mold is regulated around the entire perimeter of the mold mouth with substantial restriction of the amount of material entering angular sections of said mouth.

4. A process according to claim 1 in which part of the periphery of said plunger is maintained in continual contact with the proximate surface of said closure cavity during said stroke to dispose the portion of material peeled thereby within said body.

5. A plug-assist process for thermoforming a shaped hollow container having an integral tear strip closure and improved uniformity in wall thickness which comprises fastening heat softened thermoplastic sheet material along a border thereof spaced outside and at varying distances from the perimeter of the mouth of a female mold of substantial depth with said distance decreased in areas adjacent angles in said perimeter to restrict the area of sheet material available to be disposed in angular portions of said mold; stretching and initially forming a shaped hollow container body having an integral closure component by means including exerting a fluid pressure differential on said material sufficient to provide intimate contact of said material with the surfaces of said mold including those of a closure cavity and a retractable undercut mold surface section while said material is in a heat softened, stretchable, plastic condition; cooling said initially formed material to a softened, stretch-resistant, flexible, plastic condition while in contact with said mold surfaces; thereafter reforming and scoring said initially shaped closure component in said mold while said material is maintained in a softened, stretch-resistant, flexible, plastic condition by peeling a predetermined area of the material in the initially shaped closure component back on itself without substantial stretching in producing a single fold of material on the exterior of said closure component and scoring said single fold to provide a tear strip having grooves of predetermined total thickness in the layers of said fold using a single stroke of a reforming and scoring plunger moving into said closure cavity in proximity to the surface thereof adjacent said area of material while maintaining a clearance between at least a part of the periphery of said plunger and the adjacent surface of said closure cavity greater than twice the thickness of the layer of said material in said area to provide sufficient space for folding the material of said area without other substantial distortion thereof until the end of said stroke whereupon said plunger approaches within scoring distance of a scoring ledge on said cavity surface corresponding to the score line on said fold, and withdrawing said plunger and said retractable mold section from contact with said reformed container body to facilitate removal of said body from said mold after said material has hardened sufficiently for handling.

6. Apparatus for thermoforming a shaped hollow container body having an integral tear strip closure which comprises a female mold of substantial depth having a closure cavity communicating with the main cavity, a reforming plunger movable within said closure cavity and having a face constituting a part of the molding surface of said closure cavity, said plunger being provided with a sharp scoring edge along at least part of the periphery of said face; clamping means for fastening thermoplastic sheet material along a border thereof located outside of the mouth of said mold; means for stretching and initially forming said sheet material into a hollow body having an integral closure component including means for exerting a sufficient fluid pressure differential on said material to provide intimate contact of said material with substantially all interior surfaces of said mold while said material is in a heat softened, stretchable, plastic condition; means for cooling said initially formed material to a softened, stretch-resistant, flexible, plastic condition while in contact with said mold surfaces; means for thereafter reforming and scoring said initially shaped closure component in said closure cavity while said material is maintained in a softened, stretch-resistant, flexible, plastic condition by peeling a predetermined area of said material in the initially shaped closure component back on itself without substantial stretching in producing a single fold of said material on the exterior of said closure component and scoring said single fold to provide a tear strip having grooves of predetermined total thickness in the layers of said fold using a single stroke of said reforming plunger moving into said closure cavity in proximity to the surface thereof adjacent said area of material while maintaining a clearance between at least a part of the periphery of said plunger and the adjacent surface of said closure cavity greater than twice the thickness of the layer of said material in said area to provide sufficient space for folding the material of said area without other substantial distortion thereof until the end of said stroke whereupon said plunger approaches within scoring distance of a surface of said closure cavity, and means for moving said plunger within said closure cavity and for withdrawing said plunger from contact with the reformed hollow container body to facilitate removal of said body from said mold.

7. An apparatus according to claim 6 in which said clamping means substantially completely surrounds and is spaced at varying distances from an angular perimeter of the mouth of said female mold with said distance decreased in areas adjacent to angles in said perimeter to regulate the amount of said sheet material entering the mold around the entire perimeter of the mold mouth and provide substantial restriction of the amount of said sheet material entering angular sections of said mold mouth during a thermoforming operation in which the sheet material is stretched substantially, whereby a shaped container body of more uniform wall thickness and having a substantially thinner wall than the thickness of said sheet material is obtained.

8. An apparatus according to claim 6 in which said reforming plunger and said closure cavity are so constructed and arranged that part of the periphery of said plunger is in continual contact with the proximate surface of said closure cavity throughout said plunger stroke to dispose the portion of said material peeled thereby within said reformed container body.

9. Apparatus of the plug-assist type for thermoforming a shaped hollow container body having an integral tear strip closure and improved uniformity in wall thickness which comprises a female mold of substantial depth having a closure cavity communicating with the main cavity, a retractable undercut surface section in said mold, a reforming plunger movable within said closure cavity and having a face constituting a part of the molding surface of said closure cavity, means for moving said plunger into said closure cavity, said plunger being provided with a sharp scoring edge along at least part of the periphery of said face; clamping means for fastening heat softened thermoplastic sheet material along a border thereof spaced at varying external distances from the perimeter of the mouth of said mold with said distance decreased in areas adjacent angles in said perimeter to restrict the area of sheet material available to be disposed in angular portions of said mold; means for stretching and initially forming said sheet material into a shaped hollow container body having an integral closure component including means for exerting a sufficient fluid pressure differential on said material to provide intimate contact of said material with substantially all interior surfaces of said mold while said material is in a heat softened, stretchable, plastic condition; means for cooling said initially formed material to a softened, stretch-resistant, flexible, plastic condition while in contact with said mold surfaces; means for thereafter reforming and scoring said initially shaped closure component in said closure cavity while said material is maintained in a softened, stretch-resistant, flexible, plastic condition by peeling a predetermined area of said material in the initially shaped closure component back on itself without substantial stretching in producing a single fold of said material on the exterior of said closure component and scoring said single fold to provide a tear strip having grooves of predetermined total thickness in the layers of said fold using a single stroke of said reforming plunger moving into said closure cavity in proximity to the surface thereof adjacent said area of material while maintaining a clearance between at least part of the periphery of said plunger and the adjacent surface of said closure cavity greater thn twice the thickness of the layer of said material in said area to provide sufficient space for folding the material of said area without other substantial distortion thereof until the end of said stroke whereupon said plunger approaches within scoring distance of a scoring ledge on said cavity surface corresponding to the scoring line on said fold, and means for withdrawing said plunger and said retractable mold section from contact with said reformed container body to facilitate removal of said body from said mold after said material has hardened sufficiently for handling.

10. An apparatus according to claim 9 in which said reforming plunger and said closure cavity are so constructed and arranged that part of the periphery of said plunger is in continual contact with the proximate surface of said closure cavity throughout said plunger stroke to dispose the portion of said material peeled thereby within said reformed container body.

References Cited

UNITED STATES PATENTS

| 2,666,951 | 1/1954 | Grove et al. | 264—92 |
| 2,991,500 | 7/1961 | Hagen | 18—5 |
| 3,058,153 | 10/1962 | Busch | 18—19 |
| 3,214,797 | 11/1965 | Ollier et al. | 264—296 |
| 3,234,310 | 2/1966 | Edwards | 264—93 |
| 1,744,026 | 1/1930 | Baltzley | 24—417 |
| 3,004,285 | 10/1961 | Hagen | 264—163 |

FOREIGN PATENTS 373,171   12/1963   Switzerland.

ROBERT F. WHITE, *Primary Examiner.*

A. R. NOE, *Assistant Examiner.*